Aug. 18, 1925.
P. A. ORTON
1,550,278
REELING MECHANISM
Filed March 17, 1924 4 Sheets-Sheet 1
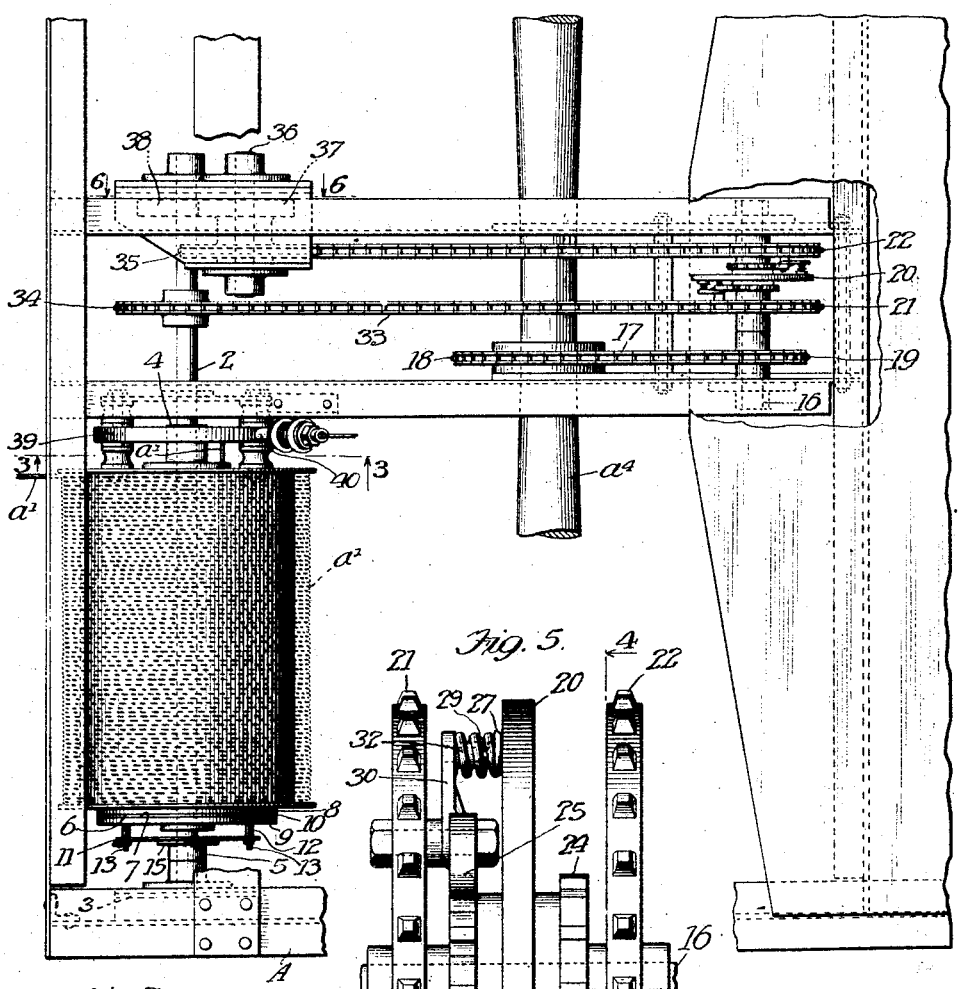

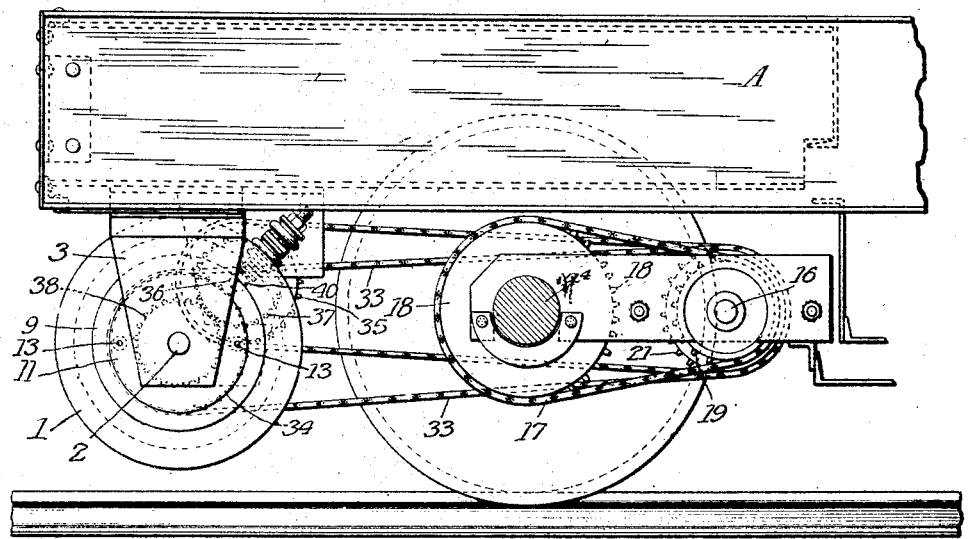

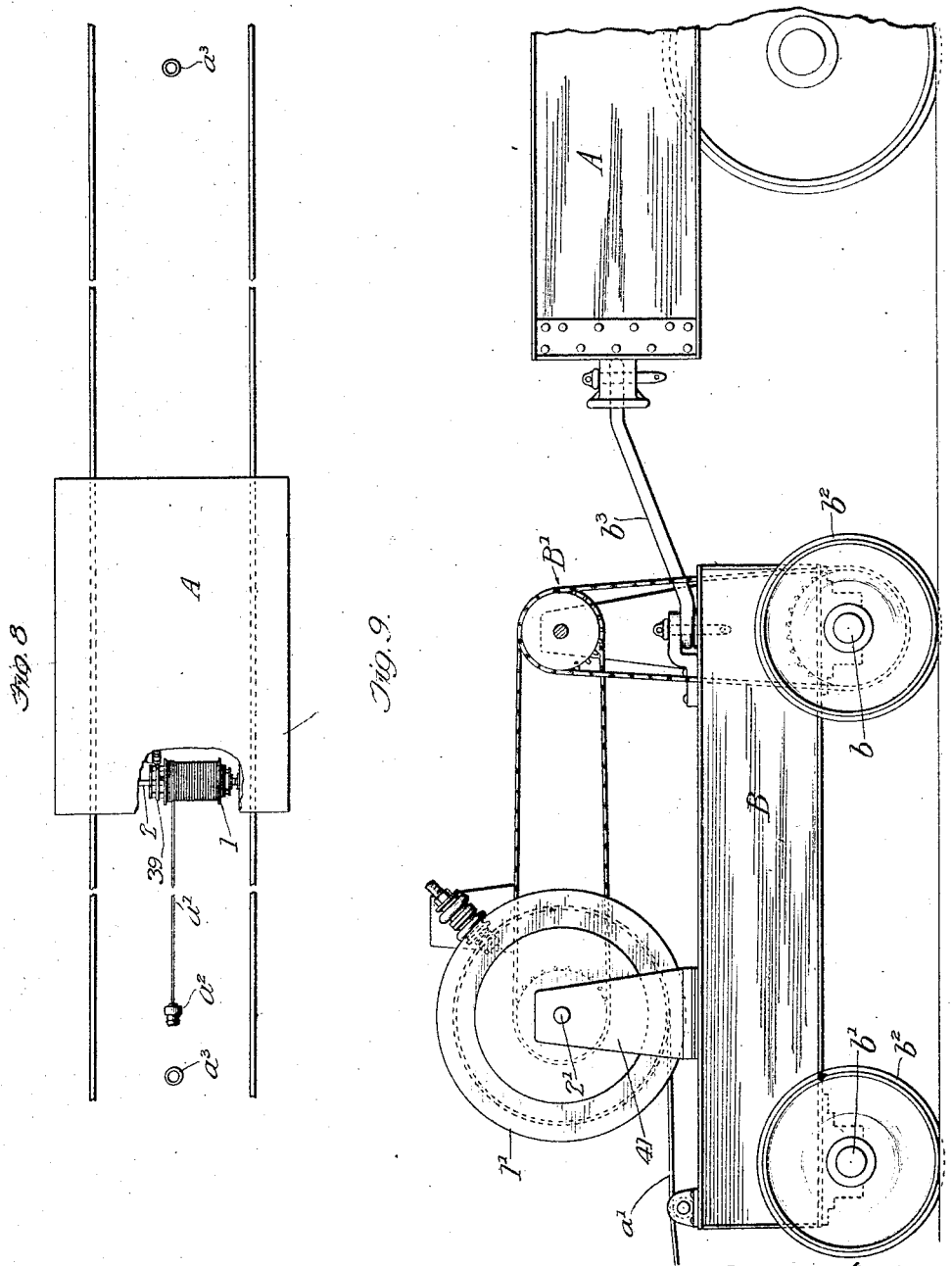

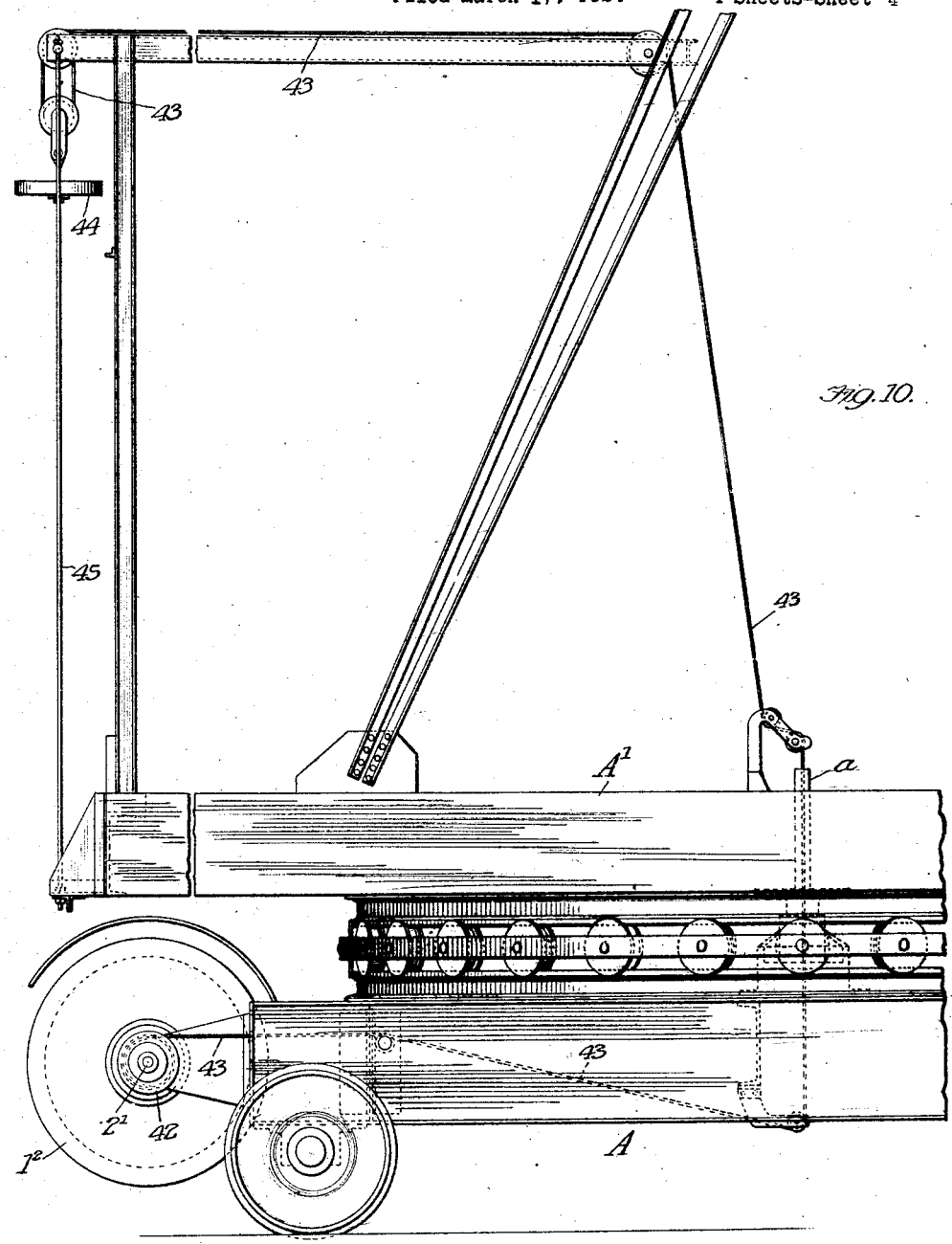

Patented Aug. 18, 1925.

1,550,278

UNITED STATES PATENT OFFICE.

PHILO A. ORTON, OF CHICAGO, ILLINOIS, ASSIGNOR TO ORTON AND STEINBRENNER COMPANY, OF HUNTINGTON, INDIANA, A CORPORATION OF INDIANA.

REELING MECHANISM.

Application filed March 17, 1924. Serial No. 699,818.

*To all whom it may concern:*

Be it known that I, PHILO A. ORTON, a citizen of the United States, and a resident of Chicago, in the county of Cook and State of Illinois, have invented an Improved Reeling Mechanism, of which the following is a specification.

This invention relates to reeling mechanism and relates particularly to reeling mechanism particularly designed and adapted for unreeling and reeling up electric cables used for operating traveling, electric cranes, shovels and the like, comprising an under frame or truck portion and a superstructure rotatably mounted thereon, on which the operating mechanism of the machine is installed.

In electrically operated railroad cranes, shovels, etc., a common practice is to provide electric sockets at spaced intervals in the road bed, the distance between sockets being substantially twice the length of the electric cable, thus giving the crane, shovel or other machine a capacity for movement on each side of the electric socket equal to the length of the electric cable. For example, if the electric cable is 250 feet long, the crane or other machine has a travel of 250 feet on each side of the electric socket in the road bed, thus giving the machine a range of travel of 500 feet.

The object of the present invention is to provide a reeling mechanism for machines of the type specified, in which the electric cable is wound upon a drum to which rotation is always imparted in the same direction, regardless of the direction of travel of the machine to which it is applied, and which will operate to maintain the electric cable taut under all operating conditions, thus preventing the formation of slack in the cable when the machine moves toward the socket into which the electric cable is plugged, effectually preventing it from becoming tangled or from lying upon the tracks so that the truck wheels will run over and possibly cut and sever it.

Broadly stated, a reeling mechanism of my invention contemplates a drum rotatably mounted on the under frame of the machine, on which the electric cable is adapted to be wound, the inner end of said cable being anchored to said drum, a contact ring or rings secured to rotate with said drum, preferably at one end thereof, with which the cable is electrically connected, a contact shoe or shoes mounted on the truck frame adapted to run in contact with said contact ring or rings on said drum, and means for imparting rotation to said drum in a direction to wind the electric cable thereupon, while, at the same time, permitting said electric cable to be unwound from said drum by movement of the machine away from a socket into which said cable is plugged. In accordance with my invention, also, the contact shoe or shoes on the under frame of the machine are electrically connected with the operating motor on the superstructure. Suitable connections for this purpose can readily be supplied by skilled electricians and are not, therefore, shown or described in detail.

In accordance with what I now consider to be the preferable embodiment of my invention as it relates to means for imparting rotation to the drum upon which the electric cable or conductor is wound, said drum is mounted to turn upon a shaft rotatable in bearings on the under frame of the machine and has frictional engagement therewith, the relation being such that said drum will rotate with said shaft when free to do so, but will slip on the shaft when the machine moves away from a socket into which the cable is plugged to permit unreeling of said cable. Rotation is adapted to be imparted to the drum shaft by driving connection with an axle or other actuated part of the machine, said driving connection comprising a transmission gear constructed and arranged for rotating the drum shaft in a direction to reel the electric cable upon the drum, regardless of the direction of travel of the machine—whether towards or from the socket into which the electric cable is plugged.

Specifically, my improved reeling mechanism comprises the various features, combinations of features and details of construction hereinafter described and claimed.

In the accompanying drawings, in which my invention is fully illustrated,

Figure 1 is a top plan view of a reeling mechanism embodying my invention and improvements showing the same mounted upon the under frame of an electric railroad crane.

Figure 2 is a side view of the parts shown in Fig. 1.

Figure 3 is an enlarged detail sectional elevation on the line 3—3 of Fig. 1.

Figure 4 is an enlarged detail sectional elevation on the line 4—4 of Fig. 5.

Figure 5 is an enlarged detail view of the transmission gearing mounted on the countershaft taken from the right hand side of Fig. 1.

Figure 6 is a fragmentary detail side view on the line 6—6 of Fig. 1.

Figure 7 is an enlarged fragmentary detail view of the means for frictionally engaging the reel drum with its shaft.

Figure 8 is a diagrammatic plan view illustrating certain features of my improved reeling mechanism as applied in use to an electric railroad crane.

Figure 9 is a diagrammatic side view showing my improved reeling mechanism mounted on a truck coupled to the under frame of an electric railroad crane; and Figure 10 is a side view illustrating a modification, in which the reeling drum is operated by a counterweight.

In the accompanying drawings, I have for purposes of clear and definite illustration, shown a reeling mechanism embodying my invention and improvements as applied in use to an electric locomotive crane.

Describing the invention with particular reference to the drawings, A designates the underframe or truck of the crane A' the superstructure thereof, said superstructure being pivotally supported on the under frame by any usual means, said means comprising an upright pivot shaft $a$. As regards its usual features, said crane may be of any desired or approved construction and will readily be understood by persons familiar with the construction and operation of such machines without a description thereof in detail.

The electric current for operating the crane is supplied thereto by an electric cable $a^1$, secured to the outer end of which is a plug $a^2$ adapted to engage a socket $a^3$ in the road bed, and which may be interchangeable in a series of such sockets arranged in spaced relation to each other, said socket or sockets being electrically connected with a source of supply of electricity not shown. The cable $a^1$ is sufficiently long to provide a desired operating range of travel of the crane, being usually about 250 feet long and permitting a range of movement of the crane of about 500 feet.

To prevent the cable $a^1$ from becoming tangled or from getting across the rails and becoming cut by the truck wheels, said cable is adapted to be wound upon a reeling mechanism mounted on the underframe or truck of the machine and actuated by driving connection with an axle or other driven part thereof, constructed and arranged to reel up said conductor wire regardless of the direction in which the crane may travel.

In accordance with what I now consider to be the preferable embodiment of my invention the construction of said reeling mechanism is as follows: The cable $a^1$ is wound upon a drum 1, supported upon a drum shaft 2 rotatably mounted in bearings in the underframe A of the crane, preferably in brackets 3 which depend therefrom. The drum 1 is loose on the shaft 2 and has frictional engagement therewith sufficient to rotate said drum to reel up the cable $a^1$, when the crane moves towards a socket into which said cable is plugged, but will permit slippage of the drum on the shaft to permit unreeling of said cable when the crane moves away from said socket.

As shown, the drum 1 is mounted between collars 4 and 5 secured to the shaft 2. As shown, both of said collars are secured to said drum shaft by set screws, so as to rotate therewith.

As shown, also, the friction drive for the drum consists of opposed surfaces 6 and 7 formed, respectively, on a raised circular portion 8 of the drum head and on a plate 9 splined to the drum shaft 2 so as to provide for limited movement of said plate endwise of said shaft, and a disk 10 of suitable material, as thermoid, being preferably inserted between the opposed surfaces 6 and 7.

The plate 9 is held in desired frictional engagement with the disk 10 by a spring disk 11 keyed to the drum shaft 2 in fixed position endwise thereof, and which is applied to said plate 9 at points remote from its axis.

The disk 11 is preferably made of spring steel or other suitable sheet metal and is connected to the plate 9 by screw studs 12, which have threaded engagement with holes formed in said plate. The outer ends 13 of the studs 12 are reduced in size and extend through holes in the spring disk 11, forming shoulders 14 on said studs against which said spring disk bears.

With the described construction, it is obvious that the pressure exerted by the spring disk 11 upon the plate 9—and thus the frictional engagement of the drum 1 with the drum shaft 2—may be increased or decreased as desired, by turning the studs 12 either to increase or decrease the flexure of said spring disk, as the case may be.

To render the spring disk 11 stronger and stiffer, a plate 15 of relatively small diameter is preferably riveted or otherwise secured centrally thereto.

Also, to provide for conveniently turning the screw studs 12, their outer ends are shaped to receive a wrench, being shown square.

Rotation is adapted to be imparted to the shaft 2 and thus to the drum 1—when said drum is free to rotate—by a transmission gearing adapted for connecting said drum shaft with the rear axle $a^4$ of the crane, said gearing preferably comprising what may be called a counter shaft 16 from which the drum shaft is driven directly. As shown, the counter shaft 16 is driven from the axle $a^4$ by means of a chain belt 17 adjusted to sprocket wheels 18 and 19 secured to said axle and counter shaft, respectively.

Said counter shaft 16 has driving connection with the drum shaft 2 by suitable gearing constructed and arranged to impart rotation to said drum shaft in a direction to wind the electric cable upon the drum 1 regardless of the direction of movement of the crane—whether towards or from the socket into which said cable is plugged. As shown, the construction and operation of said gearing is as follows:—Secured to the counter shaft 16 so as to rotate therewith, is a disk 20, which may conveniently be made of steel plate, and mounted on said counter shaft at opposite sides of said disk are sprocket wheels 21 and 22, preferably made of steel plate and which are free to turn on said shaft.

Secured to opposite sides of the disk 20 so as to rotate therewith, are ratchet wheels 23 and 24, which are duplicates of each other, excepting that the teeth thereof are reversed, and pivoted to studs on the sprocket wheels 21 and 22 are pawls 25 and 26—adapted, respectively, to engage the teeth of the ratchet wheels 23 and 24—that is, said pawls are also disposed reversely to each other. When the crane is in motion, the axle $a^4$ and the counter shaft 16 will rotate, the direction of rotation being in one direction or the other depending upon the direction of travel of the crane, and the pawls 25 and 26 are adapted to be automatically engaged with and disengaged from the ratchet wheels 23 and 24, respectively, by friction shoes 27 and 28, on shanks 29 which are fitted to bearings in the ends of arms 30 and 31 on the pawls 25 and 26, so as to be movable endwise towards and from the disk 20, and said friction shoes are maintained in desired frictional engagement with opposite sides of said disk by springs 32, inserted between said friction shoes and the pawl arms 30 and 31, being maintained in position by bosses on said pawl arms to which they are adjusted.

With the described construction and relation, it is obvious that when the counter shaft 20 rotates in one direction, the engagement of the friction shoes 27 and 28 with the disk 20 will impart pivotal movement to the pawls 25 and 26 to engage one of said pawls with its ratchet wheel and, at the same time, to disengage the other pawl from the other ratchet wheel, this operation being reversed with the direction of rotation of said counter shaft.

Rotation in one direction is adapted to be imparted to the drum shaft 2 from the sprocket wheel 21 secured to the countershaft 16 by a chain belt 33 adjusted to said sprocket wheel 21 and to a sprocket wheel 34 secured to the drum shaft 2.

Through the sprocket wheel 22, the counter shaft 16 has driving connection with the drum shaft 2 adapted for rotating said drum shaft in a reverse direction to that in which it is rotated by the sprocket wheel 21. To effect this, the sprocket wheel 22 is connected to the drum shaft by means of a reversing gear, consisting of a chain belt adjusted to said sprocket wheel and to a sprocket wheel 35 mounted to turn on a stud 36 secured in a bracket 37 which depends from the underframe of the crane in proper position, and intermeshing spur gears 37 and 38 secured to rotate with said sprocket wheel 35 and with the drum shaft 2, respectively.

With the described construction, it is obvious that, when the crane is in motion, the drum shaft 2 will always rotate in the same direction regardless of the direction of travel of the crane.

The frictional engagement of the drum 1 with the drum shaft 2 is so adjusted that rotation of the drum shaft will impart rotation to said drum to reel up the electric cable, when said drum is free to rotate, and will permit slippage of said drum on said shaft under the tension of the electric cable to permit unreeling of said cable when the crane moves away from the socket into which the cable is plugged.

Preferably, also, the transmission gear for rotating the drum shaft 2 is so designed that slight over travel will be imparted to said drum, thus providing for maintaining the electric cable taut while it is being reeled upon said drum, preventing formation of slack which might permit said cable to become tangled or to fall across the rails so as to be run over by the truck wheels of the crane.

The electric cable $a'$ is anchored to the drum 1 and the extreme end thereof is electrically connected to a contact ring 39 mounted on the end of the drum 1 so as to be electrically insulated therefrom, and mounted on the under frame of the crane is a contact shoe 40 adapted to run in contact with said contact ring 39, and which is electrically connected with the motor on the superstructure by which the crane is operated. Persons familiar with electric wiring and installation work can readily provide the necessary mounting for the contact ring 39 and shoe 40 and for connecting said shoe with the operating motor, without a description thereof in detail.

As a modification of the invention, instead of mounting the drum and operating mechanism of the reel directly upon the underframe of the crane as a unitary, fixed part thereof, I contemplate mounting the entire reeling mechanism upon a separate truck adapted to be coupled to the under frame of the crane or other machine when desired for use and uncoupled therefrom when its use is not desired.

In this modification, the drum shaft is mounted in bearings formed in brackets on the frame of the truck and is driven from an axle of the truck by a suitable transmission gearing which, as in the embodiment of the invention shown in Figs. 1 to 8 is constructed and arranged for imparting rotation to the drum shaft in the same direction regardless of the direction of travel of the truck.

This modification is shown in Fig. 9 of the drawings, in which B designates the truck as a whole, $b$, $b^1$, the axles thereof, $b^2$ the truck wheels, $1^1$ the drum of the reeling mechanism, $2^1$ the drum shaft which is driven from one of the truck axles, as the axle $b$, by a suitable transmission gearing, indicated as a whole $B^1$.

As regards the present invention, the construction of the truck is immaterial and a truck suitable for the purpose can readily be provided by persons familiar with truck construction, without a description thereof in detail.

The drum shaft $2^1$ is mounted in brackets 41 on the truck frame, and for purposes of illustration we will assume that the means for frictionally engaging the drum $1^1$ therewith and the means for imparting rotation to said drum shaft are the same as the corresponding features of the embodiment of the invention shown in Figs. 1 to 8, and will be readily understood by skilled mechanics without a description thereof in detail, from an inspection of Figs. 1 to 8 of the drawings and the description thereof contained herein.

The truck B is provided with a tongue $b^3$ which is adapted to be coupled to the under frame of the crane by any suitable form of coupling mechanism.

A particular advantage of mounting the reeling mechanism upon a separate truck as shown in Fig. 9, is that the entire reeling mechanism may thus be made and sold as a separate attachment for use on machines not originally equipped therewith.

As a further modification of the invention, instead of driving the drum shaft from the axle of the crane or other machine by means of a transmission gear, my invention contemplates a construction in which rotation is adapted to be imparted to the drum on which the electric cable is adapted to be wound by means of a counterweight applied thereto by means of a suspension cable wound upon a small drum or windlass secured to the drum 1 in axial alignment therewith, upon which the suspension cable for the counterweight is wound, said suspension cable being wound upon the said small drum or windlass in a direction opposite to that in which the electric cable is wound upon the drum 1. With this construction, the drum 1 may either be secured to the drum shaft 2 so as to rotate therewith, in which case the small drum or windlass may be secured either to the shaft or directly to the drum, or the drum may be free to turn upon the drum shaft, in which case the small drum or windlass will be secured to the drum 1 so as to rotate therewith.

This modification is illustrated in Fig. 10 of the drawings, in which $1^2$ designates the drum upon which the electric cable is reeled, $2^2$ the drum shaft, 42 the small windlass drum secured to the end of the drum $1^2$ opposite to that on which the contact ring is mounted, 43 is a suspension cable wound upon the windlass 42, 44 a counter weight secured to the end of the suspension cable 43, which is sufficiently heavy to rotate the drum $1^2$ to wind the electric cable upon the same while, at the same time, permitting rotation of said drum to pay out the electric cable under the tension of said cable as the crane or other machine moves away from the socket in the road bed into which the cable is plugged.

As shown, the counter weight 44 is vertically movable on a guide rod 45 mounted on the superstructure $A^1$ of the crane.

In order that the suspension cable 43 may be unaffected by rotation of the superstructure $A^1$ of the crane relative to the under frame A thereof, the pivot shaft $a$ for the superstructure is hollow and the suspension cable 43 passes upwards through the same over the cab of the crane to the counter weight 44, suitable guide sheaves being provided on the under frame and superstructure of the crane to properly direct said suspension cable.

I claim:

1. The combination of a vehicle, a reel mechanism mounted on said vehicle, comprising a shaft, a drum on said shaft, friction means for securing said drum to said shaft providing slipping resistance to turning movement of said drum on said shaft, a driven rotatable member on the vehicle, driving connection between said rotatable member and the drum shaft, comprising transmission gearing consisting of ratchet wheels secured to one thereof, the teeth of which are reversed, gears rotatably mounted adjacent to said ratchet wheels, pawls pivoted to said gears adapted to engage the teeth of the ratchet wheels, respectively, means controlled by rotation of said rotatable member in opposite directions to separately effect engagement and disengagement of said pawls with and from their respective ratchet wheels when said rotatable member is turned in opposite directions, and gearing which separately connects the gears actuated by said ratchet wheels with the member other than that on which said gears are mounted, one thereof being a reversing gear.

2. The combination of a vehicle, a reel mechanism mounted on said vehicle, comprising a shaft, a drum on said shaft, friction means for engaging said drum with said shaft providing slipping resistance to turning movement of said drum on said shaft, a driven rotatable member on the vehicle, and driving connection between said rotatable member and the drum shaft, comprising transmission gearing consisting of a plate and ratchet wheels secured to one thereof, said plate being arranged between said ratchet wheels and the teeth of said wheels being reversed, gears rotatably mounted adjacent to the remote sides of said ratchet wheels, pawls pivoted to said gears adapted to engage the teeth of the ratchet wheels adjacent thereto, respectively, friction means on said pawls adapted to engage opposite sides of the plate secured between said ratchet wheels constructed and arranged to impart pivotal movement to said pawls to separately effect engagement and disengagement of said pawls with their respective ratchet wheels when said rotatable member is turned in opposite directions, and gearing which separately connects the gears actuated by said ratchet wheels with the member other than that on which said gears are mounted, one thereof being a reversing gear.

3. The combination as specified in claim 1, in which the driven rotatable member is a countershaft having driving connection with an axle of the vehicle.

4. The combination as specified in claim 2, in which the means for frictionally engaging the ratchet pawls with the actuating plate, comprises friction shoes mounted on said pawls and movable towards and from said actuating plate, and means for maintaining said shoes yieldingly in engagement with opposite sides of said plate.

In witness that I claim the foregoing as my invention, I affix my signature this 29 day of February, A. D. 1924.

PHILO A. ORTON.